United States Patent Office 2,870,056
Patented Jan. 20, 1959

2,870,056

FUNGICIDAL COMPOSITIONS COMPRISING THE MONO-PHENYLHYDRAZONES OF α-DIKETONES, α-KETOALDEHYDES, AND α-HYDROXYKETONES

Ernest G. Jaworski, Florissant, Mo., and Dexter B. Sharp, Dayton, Ohio, assignors to Monsanto Chemical Company, St. Louis, Mo., a corporation of Delaware No Drawing. Application September 21, 1954
Serial No. 457,560

11 Claims. (Cl. 167—30)

This invention relates to new and useful improvements in biological toxicants. The invention further relates to methods of treating plants and other organic materials which are subject to attack by fungi, and is particularly concerned with eradicants for cereal plant rusts, especially wheat rust.

We have found that unusually effective fungicidal compositions are obtained when the active ingredient is a mono-hydroazone derived from a hydrazine having the formula

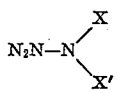

in which X is a hydrocarbon radical free of non-benzenoid unsaturation, such as aliphatic and aromatic hydrocarbon radicals, and containing from 1 to 12 carbon atoms and X' is selected from the class consisting of X and hydrogen; and a carbonylic compound selected from the class consisting of α-diketones of the formula

in which Y is a hydrocarbon radical free of non-benzenoid unsaturation, such as aliphatic and aromatic hydrocarbon radicals, and containing from 1 to 8 carbon atoms; α-ketoaldehydes of the formula

in which Y is a hydrocarbon radical free of non-benzenoid unsaturation, such as aliphatic and aromatic hydrocarbon radicals, and containing from 1 to 16 carbon atoms; glyoxal; α-hydroxy ketones of the formula

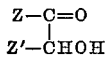

in which Z is a hydrocarbon radical free of non-benzenoid unsaturation, such as aliphatic and aromatic hydrocarbon radicals, and containing from 1 to 8 carbon atoms and Z' is selected from the class consisting of Z and hydrogen, and α-hydroxyaldehydes

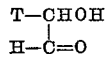

in which T is Y or hydrogen.

The presently useful hydrazones are readily obtainable, in known manner, by the condensation of the appropriately substituted hydrazine with the appropriate carbonylic compound.

One group of hydrocarbon hydrazines having the above formula includes the alkyl- or 1,1-dialkylhydrazines having from 1 to 12 carbon atoms in the alkyl radical, e. g., ethyl-, amyl-, or n-octylhydrazine or 1,1-di-n-propyl-, 1,1-diisohexyl- or 1-amyl-1-butylhydrazine. Another group includes the cycloalkyl or 1,1-dicycloalkylhydrazines, e. g., cyclopentyl-, 1,1-dicyclohexyl- or 1-cyclohexyl-1-(3-methylcyclopentyl)hydrazine. Still another group includes the aralkyl or the 1,1-bis(aralkyl)-hydrazines such as 2-phenylethylhydrazine or 1,1-dibenzylhydrazine. A very useful group includes hydrazines having an aryl or alkaryl radical of up to 12 carbon atoms attached to one nitrogen atom and either hydrogen or a hydrocarbon radical free of non-benzenoid unsaturation attached to the same nitrogen atoms, e. g., phenylhydrazine, p-tolylhydrazine, 2,4-dimethylphenylhydrazine or 2-ethylphenylhydrazine and the 1-alkyl, aryl, aralkyl, alkaryl or cycloalkyl derivatives thereof such as 1-methyl-1-phenylhydrazine, 1-isoamyl-1-phenylhydrazine, 1-cyclohexyl-1-o-tolylhydrazine, 1-benzyl-1-phenylhydrazine, 1, 1- diphenylhydrazine, etc. In the useful hydrazines, there may be only one hydrocarbon radical attached to one of the nitrogen atoms or there may be two of the same hydrocarbon radicals or two dissimilar hydrocarbon radicals attached to the one nitrogen atom. Because of the easy availability of phenylhydrazine, the condensation products of this particular hydrazine derivative and the appropriate α-dicarbonylic or α-hydroxy carbonylic compound is advantageously used in the preparation of the present fungicidal compositions.

Carbonylic compounds useful in preparing the presently employed mono-hydrazones are the α-diketones, glyoxal, the α-keto-aldehydes, the α-keto-alcohols and the α-hydroxyaldehydes defined above.

Examples of the α-diketone phenylhydrazones useful for the present purpose are:

2,3-butanedione phenylhydrazone
1,4-diphenyl-2,3-butanedione 1-methyl-1-phenylhydrazone
1,4-dicyclohexyl-2,3-butanedione cyclohexylphenylhydrazone
Benzil 1-n-amyl-1(4-tolyl)hydrazone
4,4'-diphenylbenzil phenylhydrazone
1-phenyl-1,2-butanedione 1-naphthylhydrazone
1-phenyl-1,2-propanedione 4-biphenylylhydrazone
2,3-pentanedione 1-cyclohexyl-1-methylhydrazone
2,3-hexanedione benzylhydrazone
2,7-dimethyl-4,5-octanedione 1-ethyl-1-(4-ethylphenyl)-hydrazone Examples of α-keto-aldehyde hydrazones which are useful as the effective fungicidal ingredients of this invention are:

Pyruvaldehyde phenylhydrazone
Phenylpyruvaldehyde 1-naphthylhydrazone
Isopropylglyoxal benzylhydrazone
Phenylglyoxal (2-phenylethyl)hydrazone
4-tolylglyoxal 1,1-diisobutylhydrazone
2,4,6-triethylphenylglyoxal phenylhydrazone
2,4-xylylglyoxal cyclopentylhydrazone
4-biphenylylglyoxal 1-(4-ethylbenzyl)hydrazone
α-naphthylglyoxylaldehyde phenylhydrazone
Cyclopropylglyoxylaldehyde 2-tolylhydrazone
Cyclohexylglyoxylaldehyde 1-methyl-1-cyclohexylhydrazone Illustrative of the presently useful α-hydroxy ketone hydrazones are:

Hydroxyacetone 1-methyl-1-phenylhydrazone
1-hydroxybutan-2-one 2-naphthylhydrazone
3-hydroxybutan-2-one 4-tert-butylphenylhydrazone
3-hydroxypentan-2-one 1,1-diphenylhydrazone
4-hydroxyhexan-3-one n-dodecylhydrazone
Benzyl hydroxymethyl ketone 1-methyl-1-(3,4-xylyl)hydrazone
α-hydroxyacetophenone phenylhydrazone
1-hydroxyethyl phenyl ketone benzylhydrazone
Benzoin 4-tolylhydrazone
Hydroxymethyl 2-methylcyclopentyl ketone phenylhydrazone Examples of α-hydroxy aldehyde hydrazones which are effective fungicidal ingredients of the present compositions are:

Glycolaldehyde phenylhydrazone
Benzylglycolaldehyde 1-n-hexyl-1-phenylhydrazone
Lactaldehyde 1-naphthylhydrazone
Mandelicaldehyde 1-isopropyl-1-(4-tolyl)hydrazone We have discovered that the hydrazones herein defined are highly efficient for preventing and retarding fungus growth on plants, fruits, seeds, soils, fur, leather, cotton, wool and organic materials in general. They may be applied directly to the organic material which is to be treated, but because the present hydrazones are effective in extremely dilute concentrations, it is preferred to incorporate them with a carrier or diluent.

Fungicidal dusts may be prepared by mixing the hydrazones with dusting materials such as talc, clay, lime, bentonite, pumice, fuller's earth, etc. The hydrazones may be dissolved in organic solvents therefor and the resulting solutions used as fungicidal or fungi-preventing sprays. More expediently a small amount of concentrated solution of the hydrazone in an organic solvent, e. g., cyclohexanone, may be added to water in the presence of an emulsifying agent to form an emulsion and the oil-in-water emulsion thus obtained is employed as a spray. Suspensions or dispersions of the hydrazone in a solvent such as water are advantageously employed in the treatment of such plant foliage, textiles, leather or other material with which it is not desirable to employ either a solid carrier or an organic solvent.

Fungicidal compositions comprising the present hydrazones may be applied only to the surface of the material to be treated as when treating foliage, fur, leather and other comparatively impregnable materials upon which fungus growth is to be prevented or retarded. In other cases, for example, when it is desired to protect seeds from soil microorganisms harmful to the seeds and plants, the hydrazone, preferably incorporated with solid carriers, may be simply mixed with the seed for protection of fruits, seeds, plant tubers, etc. during storage, or it may be advantageous to effect the treatment by employing baths comprising aqueous emulsions of the fungicides. Impregnation of textiles with the fungicide is also advantageously effected in baths.

The presently employed hydrazones are particularly valuable in the control of cereal rusts, whereby they function as plant chemotherapeutants against the various leaf and stem rusts of wheat, barley, rye, and oats and other small grain crop plants. Such cereal rusts as the stem rust *Puccinia graminis tritici* or the leaf rust *P. rubigo-vera tritici* or the stripe rust *P. glumarum* of wheat usually cannot be controlled by general purpose fungicides. The stem and crown rusts of oats *P. graminis avenae* and *P. coronata avenae*, as well as the stem rust of rye *P. graminis secalis* or the leaf rust *P. hordei* of barley display similar resistance.

In prior art, much effort has been expended in the past in breeding rust-resistant strains of these cereals; but as new strains of, e. g., wheat, are developed, new races of the above classes of rusts appear and proceed to attack the new, presumably rust-resistant strains of wheat. The history of breeding for rust resistance thus comprises a recurrent introduction of cereal strains which are resistant to prevailing races of the rusts and subsequent appearance of new races of rusts to which the recently introduced cereal strains are susceptible. Accordingly, the eradication of fungus growth by chemical treatment of cereal plants has become subjected to close scrutiny. Unfortunately most of the known fungicides have been found to be unsuitable either because they do not prevent or destroy rust growth at non-phytotoxic concentrations or because their physical and chemical nature prevents a commercially expedient means of application. Particularly when aerial dusting or spraying is the contemplated means of application, particle size and solubility are of extreme importance.

The invention is further illustrated, but not limited, by the following examples:

*Example 1*

The therapeutic effect of benzoin mono-phenylhydrazone on wheat was determined as follows:

Five uniform, six-day old seedlings of a rust-susceptible variety of wheat (Seneca) were sprayed with water by means of an atomizer. The individual leaves were then gently rubbed between the thumb and index finger to remove the "bloom," and then inoculated with *Puccinia rubigo-vera tritici* by gently scraping, up and down the back sides of the rubbed leaves, a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed with an emulsion prepared as follows:

The hydrazone (100 mg.) was added to 5 ml. of acetone, and there was then introduced to the resulting solution approximately 0.1 ml. of an emulsifying agent known to the trade as "Tween 20" and reputed to be a polyoxyethylene sorbitan monolaurate. The whole was then diluted with 5 ml. of water to give an emulsion containing 1% by weight of the hydrazone. For the instant test the 1% emulsion was further diluted with water to give respective emulsions containing 0.5% and 0.25% by weight of the hydrazone.

Spraying of the plants with the emulsions was effected by means of an atomizer, 5 ml. of each emulsion being used per pot of 5 plants. The sprayed plants were then returned to the greenhouse and held there for a week. Observation of the plants at the end of that time disclosed that the plants which had been sprayed with both the 0.5% and the 0.25% emulsions of the benzoin mono-phenylhydrazone were entirely free of rust pustules. Similarly inoculated but unsprayed plants which had been maintained in the incubator and greenhouse for the same length of time were found to be badly affected by the rust.

*Example 2*

In this example, 4-biphenylylglyoxal mono-phenylhydrazone was tested for its wheat rust eradicating efficiency. Employing the testing procedure described in Example 1, substantial suppression of the wheat rust was observed with plants which had been sprayed with an 0.5% emulsion of the hydrazone and there was no evidence of any phytotoxic effect of said emulsion.

*Example 3*

Benzil mono-phenylhydrazone was tested against wheat rust according to the procedure of Example 1 using a 0.5% emulsion of this hydrazone. Complete inhibition of the rust on rust-inoculated plants which had been sprayed with the emulsion was observed.

What we claim is:

1. A fungicidal composition comprising water, an emulsifying agent, and the mono-phenylhydrazone of a carbonylic compound selected from the class consisting of α-diketones of the formula

in which R and R' are selected from the class consisting of alkyl and aryl radicals containing from 1 to 8 carbon atoms; α-ketoaldehydes of the formula

in which Y is selected from the class consisting of alkyl and aryl radicals containing from 1 to 16 carbon atoms; glyoxal; α-hydroxy ketones of the formula

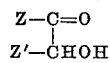

in which Z is selected from the class consisting of alkyl and aryl radicals containing from 1 to 8 carbon atoms and Z' is selected from the class consisting of Z and hydrogen; and α-hydroxyaldehydes of the formula

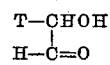

in which T is selected from the class consisting of hydrogen and alkyl and aryl radicals containing from 1 to 16 carbon atoms.

2. The method of protecting organic material susceptible to attack by fungi which comprises applying to said material, for the purpose of fungus-proofing, a fungicidal composition containing as the essential active ingredient the mono-phenylhydrazone of a carbonylic compound selected from the class consisting of α-diketones of the formula

in which R and R' are selected from the class consisting of alkyl and aryl radicals containing from 1 to 8 carbon atoms; α-ketoaldehydes of the formula

in which Y is selected from the class consisting of alkyl and aryl radicals containing from 1 to 16 carbon atoms; glyoxal; α-hydroxy ketones of the formula

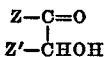

in which Z is selected from the class consisting of alkyl and aryl radicals containing from 1 to 8 carbon atoms and Z' is selected from the class consisting of Z and hydrogen; and α-hydroxyaldehydes

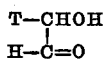

in which T is selected from the class consisting of hydrogen and alkyl and aryl radicals containing from 1 to 16 carbon atoms.

3. A wheat rust eradicant comprising water, an emulsifying agent, and a mono-phenylhydrazone of an α-diketone of the formula

in which R and R' are selected from the class consisting of alkyl and aryl radicals containing from 1 to 8 carbon atoms.

4. A wheat rust eradicant comprising water, an emulsifying agent, and a mono-phenylhydrazone of an α-ketoaldehyde of the formula

in which Y is selected from the class consisting of alkyl and aryl radicals containing from 1 to 16 carbon atoms.

5. A wheat rust eradicant comprising water, an emulsifying agent, and the mono-phenylhydrazone of benzoin.

6. A wheat rust eradicant comprising water, an emulsifying agent, and the mono-phenylhydrazone of benzil.

7. A wheat rust eradicant comprising water, an emulsifying agent, and the mono-phenylhydrazone of 4-biphenylylglyoxal.

8. The method of inhibiting the development of rust on wheat which comprises applying to the wheat a rust inhibiting quantity of a wheat rust eradicant comprising as the essential active ingredient the mono-phenylhydrazone of a carbonylic compound selected from the class consisting of α-diketones of the formula

in which R and R' are selected from the class consisting of alkyl and aryl radicals containing from 1 to 8 carbon atoms; α-ketoaldehydes of the formula

in which Y is selected from the class consisting of alkyl and aryl radicals containing from 1 to 16 carbon atoms; glyoxal; α-hydroxy ketones of the formula

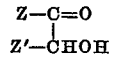

in wihch Z is selected from the class consisting of alkyl and aryl radicals containing from 1 to 8 carbon atoms and Z' is selected from the class consisting of Z and hydrogen; and α-hydroxyaldehydes

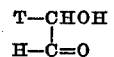

in which T is selected from the class consisting of hydrogen and alkyl and aryl radicals containing from 1 to 16 carbon atoms.

9. The method of inhibiting the development of rust on wheat which comprises applying to the wheat a rust inhibiting quantity of a wheat rust eradicant comprising the mono-phenylhydrazone of benzoin as the essential active ingredient.

10. The method of inhibiting the development of rust on wheat which comprises applying to the wheat a rust inhibiting quantity of a wheat rust eradicant comprising the mono-phenylhydrazone of benzil as the essential active ingredient.

11. The method of inhibiting the development of rust on wheat which comprises applying to the wheat a rust inhibiting quantity of a wheat rust eradicant comprising the mono-phenylhydrazone of 4-biphenylylglyoxal as the essential active ingredient.

References Cited in the file of this patent

UNITED STATES PATENTS 2,758,050    Hackmann _____ Aug. 7, 1956

FOREIGN PATENTS 462,599    Great Britain _____ July 13, 1936

OTHER REFERENCES

Beilstein, vol. 15, pp. 173, 200, 4th ed., J. Springer Co., Berlin.

McNew: Phytopathology, vol. 39, 1949, pp. 721–751.

UNITED STATES PATENT OFFICE
CERTIFICATE OF CORRECTION

Patent No. 2,870,056 January 20, 1959

Ernest G. Jaworski et al.

It is hereby certified that error appears in the printed specification of the above numbered patent requiring correction and that the said Letters Patent should read as corrected below.

Column 1, lines 21 to 28, the formula should appear as shown below instead of as in the patent:

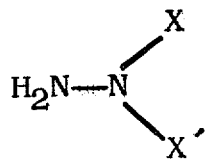

line 38, for "Y is a hydrocarbon radical" read -- R and R´ are hydrocarbon radicals --.

Signed and sealed this 23rd day of August 1960.

(SEAL)
Attest:
KARL H. AXLINE
Attesting Officer

ROBERT C. WATSON
Commissioner of Patents